United States Patent
Gaur

(10) Patent No.: US 8,483,265 B2
(45) Date of Patent: Jul. 9, 2013

(54) GENERALIZED DECISION FEEDBACK EQUALIZER PRECODER WITH INPUT COVARIANCE MATRIX CALCULATION FOR MULTI-USER MULTIPLE-INPUT MULTIPLE-OUTPUT WIRELESS TRANSMISSION SYSTEMS

(75) Inventor: Sudhanshu Gaur, Campbell, CA (US)

(73) Assignee: Hitachi, Ltd., Tokyo (JP)

( * ) Notice: Subject to any disclaimer, the term of this patent is extended or adjusted under 35 U.S.C. 154(b) by 978 days.

(21) Appl. No.: 12/554,069

(22) Filed: Sep. 4, 2009

(65) Prior Publication Data

US 2011/0058598 A1  Mar. 10, 2011

(51) Int. Cl.
*H03H 7/30* (2006.01)
*H03H 7/40* (2006.01)
*H03K 5/159* (2006.01)

(52) U.S. Cl.
USPC .......................................................... 375/233

(58) Field of Classification Search
USPC .................................................. 375/232, 233
See application file for complete search history.

(56) References Cited

PUBLICATIONS

Q. Spencer et al., "Zero-Forcing Methods for Downlink Spatial Multiplexing in Multiuser MIMO Channels", IEEE Transactions on Signal Processing, vol. 52, No. 2, pp. 461-471, Feb. 2004.
C. Windpassinger et al., "Precoding in Multi-Antenna and Multi-User Communications", IEEE Transactions on Wireless Communications, pp. 1305-1316, Jul. 2004.
W. Yu, "Competition and Cooperation in Multi-User Communication Environments", PhD Dissertation, 128 pages, Jun. 2002.
W. Yu et al., "Sum Capacity of Gaussian Vector Broadcast Channels", IEEE Transactions on Information Theory, vol. 50, No. 9, pp. 1875-1892, Sep. 2004.
X. Shao et al., "Precoder Design for MIMO Broadcast Channels", IEEE International Conference on Communications (ICC), pp. 788-794, May 2005.
N. Jindal et al., "Sum Power Iterative Water-Filling for Multi-Antenna Gaussian Broadcast Channels", IEEE Transactions on Information Theory, vol. 51, No. 4, pp. 1570-1580, Apr. 2005.
W. Yu, "The Structure of Least-Favorable Noise in Gaussian Vector Broadcast Channels", Advances in Network Information Theory, DIMACS Series in Discrete Mathematics and Theoretical Computer Science, vol. 66, pp. 159-171, Mar. 2003.
G. Munz et al., "An Efficient Waterfilling Algorithm for Multiple Access OFDM", IEEE Global Telecommunications Conference 2002, 5 pages, Nov. 2002.

*Primary Examiner* — Sam K Ahn
*Assistant Examiner* — Tanmay Shah
(74) *Attorney, Agent, or Firm* — Mattingly & Malur, PC

(57) ABSTRACT

To realize a GDFE precoder for multi-user MIMO systems, which significantly reduces the computational cost while resulting in no capacity loss, one method comprises computing an effective UL channel matrix $H_{UL}$ using one of two methods $H_{UL}=H_{DL}^H$, or $H_{UL}=[(P_t/N_t)H_{DL}^H H_{DL}+I]^{-1/2}H_{DL}^H$; extracting $H_k$ from $H_{UL}$; computing a singular value decomposition of the DL channel between the BS and $k^{th}$ UT, $H_k$, for all K UTs, $H_k=U_k S_k V_k^H$; extracting all singular values as $s=[\text{diag}(S_1), \ldots, \text{diag}(S_K)]$; extracting a vector $\hat{s}$ from s by choosing first utmost $N_t$ largest non-zero singular values of s; sorting elements in $\hat{s}$ in decreasing order; performing waterfilling to allocate power and obtain a diagonal matrix $\Gamma_k$ representing power allocations corresponding to the singular values of the $k^{th}$ UT; computing an UL covariance matrix for each UT as $\Phi_k=U_k\Gamma_k U_k^H$; and obtaining an overall input covariance matrix D for the equivalent UL channel.

20 Claims, 10 Drawing Sheets

GENERALIZED DECISION FEEDBACK EQUALIZER PRECODER WITH INPUT COVARIANCE MATRIX CALCULATION FOR MULTI-USER MULTIPLE-INPUT MULTIPLE-OUTPUT WIRELESS TRANSMISSION SYSTEMS

RELATED APPLICATIONS

The present application is related to U.S. patent application Ser. No. 12/401,711, filed Mar. 11, 2009, and concurrently filed U.S. patent application Ser. No. 12/554,082 (GENERALIZED DECISION FEEDBACK EQUALIZER PRECODER WITH RECEIVER BEAMFORMING FOR MATRIX CALCULATIONS IN MULTI-USER MULTIPLE-INPUT MULTIPLE-OUTPUT WIRELESS TRANSMISSION SYSTEMS), the entire disclosures of which are incorporated herein by reference.

BACKGROUND OF THE INVENTION

The present invention relates generally to multiple-input multiple-output (MIMO) communications systems and, more particularly, to Generalized Decision Feedback Equalizer (GDFE) based precoder configuration in MIMO systems and input covariance matrix calculation.

It is well known that a Generalized Decision Feedback Equalizer (GDFE) based precoder provides the optimal capacity solution for Multi-user Multiple-Input Multiple-Output (MU-MIMO) wireless systems. However, the computational cost of determining various filters associated with the GDFE precoder is often prohibitive and is not suitable for many practical systems.

There are several known precoding techniques which can enable a Base Station (BS) equipped with multiple antennas to send simultaneous data streams to multiple user terminals (UTs) in order to optimize system capacity. In general, precoding for a MU-MIMO system aims to optimize a certain criterion such as system capacity or bit error rate. Selected references are noted below, together with a description of relevant aspects of the techniques proposed therein.

Q. H Spencer, A. L. Swindlehurst, and M. Haardt, "Zero-forcing methods for downlink spatial multiplexing in multi-user MIMO channels", IEEE Transactions on Signal Processing, pp. 461-471, February 2004 [1] describes a linear precoding technique, known as Block Diagonalization (BD), which separates out the data streams to different UTs by ensuring that interference spans the Null Space of the victim UT's channel. The BD technique diagonalizes the effective channel matrix so as to create multiple isolated MIMO sub-channels between the BS and the UTs. Although this scheme is simple to implement, it limits system capacity somewhat.

C. Windpassinger, R. F. H Fischer, T. Vencel, and J. B Huber, "Precoding in multi-antenna and multi-user communications", IEEE Transactions on Wireless Communications, pp. 1305-1316, July 2004 [2] describes a non-linear precoding scheme known as Tomlinson-Harashima Precoding (THP). This scheme relies on successive interference pre-cancellation at the BS. A modulo operation is used to ensure that transmit power is not exceeded. Different from BD, THP triangularizes the effective channel matrix and provides somewhat higher system capacity when compared to BD.

In W. Yu, "Competition and Cooperation in Multi-User Communication Environments", PhD Dissertation, Stanford University, February 2002 [3] and W. Yu and J. Cioffi, "Sum capacity of Gaussian vector broadcast channels", IEEE Transactions on Information Theory, pp. 1875-1892, September 2004 [4], Wei Yu introduced the GDFE precoder and showed that it achieves a high degree of system capacity. The basic components of this scheme are illustrated in FIG. 1. The GDFE precoder includes an interference pre-cancellation block 101. Similar to the THP precoding scheme discussed in reference [2] above, the interference pre-cancellation helps to ensure that the symbol vector encoded at the $k^{th}$ step will suffer from the interference from (k−1) symbol vectors only. Information symbols u are processed by the interference pre-cancellation block 101 to produce filtered vector symbols x.

The filtered vector symbols x are then passed through a transmit filter 103 denoted by matrix B to produce transmitted signals y. In reference [3] and [4], a technique based on the covariance matrix ($S_{zz}$) corresponding to "Least Favorable Noise" is proposed to compute the GDFE precoder components. Although, this technique achieves a high degree of system capacity, the computational cost of determining the GDFE precoder components is effectively prohibitive for a real-time implementation required by most practical systems.

X. Shao, J. Yuan and P. Rapajic, "Precoder design for MIMO broadcast channels", IEEE International Conference on Communications (ICC), pp. 788-794, May 2005 [5] proposes a different precoding technique which achieves a capacity close to the theoretical maximum system capacity. The proposed method is computationally less complex compared to the GDFE precoder technique. However, the proposed method allocates equal power to all data streams, which may not be an effective technique for practical systems using a finite number of quantized bit-rates. Also, the proposed technique is limited to invertible channel matrices, which may not always be the case.

N. Jindal, W. Rhee, S. Vishwanath, S. A. Jafar, and A. Goldsmith, "Sum Power Iterative Water-filling for Multi-Antenna Gaussian Broadcast Channels", IEEE Transactions on Information Theory, pp. 1570-1580, April 2005 [6] derives a very useful result referred to as the MAC/BC (multiple access channel/broadcast channel) duality; and Wei Yu, DIMACS Series in Discrete Mathematics and Theoretical Computer Science, Vol. 66, "Advances in Network Information Theory," pp. 159-171 [7] develops the concept of least favorable noise.

The entire disclosures of the above references are incorporated herein by reference.

BRIEF SUMMARY OF THE INVENTION

Exemplary embodiments of the invention provide a technique to realize a GDFE precoder for multi-user (MU) MIMO systems, which significantly reduces the computational cost while resulting in no capacity loss. The technique is suitable for improving the performance of various MU-MIMO wireless systems including presently planned future "4G" cellular networks. The computation of GDFE filter requires knowledge of Input Covariance Matrix for the Uplink (UL) channel as well as the Downlink (DL) channel. This invention focuses on the algorithm for determining a suitable Input Covariance Matrix, D, for the UL channel to facilitate GDFE implementation presented in U.S. patent application Ser. No. 12/401,711.

In Ser. No. 12/401,711, the implementation of a GDFE precoder relaxes the requirement for knowledge of the covariance matrix ($S_{zz}$) corresponding to "Least Favorable Noise." This is the key component in conventional design of a GDFE precoder and requires extensive computational cost. It also provides a uniform framework for realizing a GDFE precoder. Unlike a conventional GDFE precoder design, the proposed method does not require channel reduction when the Input Covariance Matrix ($S_{xx}$) for the DL channel is rank deficient.

The present invention reduces the algorithm complexity for determining the Input Covariance Matrix D for the equivalent UL channel assuming no coordination among different user terminals (UTs). This in turn allows for an efficient computation of the Input Covariance Matrix $S_{xx}$ for the DL channel. The efficient computation of these two matrices, D and helps to realize GDFE precoder with significantly reduced complexity and significant improvement in computational cost. Also, unlike conventional algorithms for computing D, the proposed algorithm ensures that the rank of matrix D does not exceed the total number of transmit antennas at the Base Station (BS).

An aspect of the present invention is directed to a method for processing user symbols with a generalized decision feedback equalizer (GDFE) based precoder in a base station (BS) of a multi-user multiple-input multiple-output (MU-MIMO) wireless system having K user terminals (UTs) which communicate with the base station via an uplink (UL) channel and a corresponding downlink (DL) channel, the base station having $N_t$ antennas and $P_t$ as available transmit power, the DL channel being represented by a DL channel matrix $H_{DL}$. The method comprises computing an effective UL channel matrix $H_{UL}$ using one of two methods (i) $H_{UL}=H_{DL}^H$, or (ii) $H_{UL}=[(P_t/N_t)H_{DL}^H H_{DL}+I]^{-1/2}H_{DL}^H$; extracting $H_k$, k=1, 2, ..., K, from the UL channel matrix $H_{UL}=[H_1^H, H_2^H, \ldots, H_K^H]$, where $H_k^H$ corresponds to an equivalent UL channel for the $k^{th}$ UT, and I is an identity matrix; computing a singular value decomposition (SVD) of the DL channel between the BS and $k^{th}$ UT, $H_k$, for all K UTs, $H_k=U_k S_k V_k^H$ where $U_k$ denotes left singular vectors, $S_k$ is a diagonal matrix with singular values making up the diagonal, and $V_k$ denotes right singular vectors; extracting all singular values as $s=[\text{diag}(S_1), \ldots, \text{diag}(S_K)]$; extracting a vector $\hat{s}$ from s by choosing first utmost $N_t$ largest non-zero singular values of s; sorting elements in $\hat{s}$ in decreasing order; performing water-filling to allocate power and obtain a diagonal matrix $\Gamma_k$ representing power allocations corresponding to the singular values of the $k^{th}$ UT; computing an UL covariance matrix for each UT as $\Phi_k=U_k \Gamma_k U_k^H$; obtaining an overall input covariance matrix D for the equivalent UL channel as $$D = BlockDiag[\Phi_1, \Phi_2, \ldots, \Phi_K] = \begin{bmatrix} \Phi_1 & 0 & 0 \\ 0 & \vdots & 0 \\ 0 & 0 & \Phi_K \end{bmatrix},$$

where BlockDiag(.) function generates a block diagonal matrix by placing input matrix arguments at diagonals; computing a filter matrix C based on the UL covariance matrix D; computing a feedforward filter matrix F based on the filter matrix C; computing an interference pre-cancellation matrix G, based on the feedforward filter matrix F and the filter matrix C, used in a transmitter at an interference pre-cancellation stage of the GDFE precoder; and processing user symbols by a decision feedback equalizing stage of the GDFE precoder to produce filtered vector symbols.

Another aspect of the invention is directed to a generalized decision feedback equalizer (GDFE) based precoder in a base station (BS) of a multi-user multiple-input multiple-output (MU-MIMO) wireless system having K user terminals (UTs) which communicate with the base station via an uplink (UL) channel and a corresponding downlink (DL) channel, the base station having $N_t$ antennas and $P_t$ as available transmit power, the DL channel being represented by a DL channel matrix $H_{DL}$. The GDFE precoder comprises a feedforward path; a feedback path; and an interference pre-cancellation block denoted by I-G disposed in the feedback path, I being an identity matrix, G being an interference pre-cancellation matrix. The interference pre-cancellation matrix G is computed based on a feedforward filter matrix F and a filter matrix C, the feedforward filter matrix F is computed based on the filter matrix C, and the filter matrix C is computed based on an uplink (UL) covariance matrix D. The UL covariance matrix D is computed by computing an effective UL channel matrix $H_{UL}$ using one of two methods (i) $H_{UL}=H_{DL}^H$, or (ii) $H_{UL}=[(P_t/N_t)H_{DL}^H H_{DL}+I]^{-1/2}H_{DL}^H$; extracting $H_k$, k=1, 2, ..., K, from the UL channel matrix $H_{UL}=[H_1^H, H_2^H, \ldots, H_K^H]$ where $H_k^H$ corresponds to an equivalent UL channel for the $k^{th}$ UT, and I is an identity matrix; computing a singular value decomposition (SVD) of the DL channel between the BS and $k^{th}$ UT, $H_k$, for all K UTs, $H_k=U_k S_k V_k^H$, where $U_k$ denotes left singular vectors, $S_k$ is a diagonal matrix with singular values making up the diagonal, and $V_k$ denotes right singular vectors; extracting all singular values as $s=[\text{diag}(S_1), \ldots, \text{diag}(S_K)]$; extracting a vector $\hat{s}$ from by choosing first utmost $N_t$ largest non-zero singular values of s; sorting elements in $\hat{s}$ in decreasing order; performing water-filling to allocate power and obtain a diagonal matrix $\Gamma_k$ representing power allocations corresponding to the singular values of the $k^{th}$ UT; computing an UL covariance matrix for each UT as $\Phi_k=U_k \Gamma_k U_k^H$; and obtaining an overall input covariance matrix D for the equivalent UL channel as $$D = BlockDiag[\Phi_1, \Phi_2, \ldots, \Phi_K] = \begin{bmatrix} \Phi_1 & 0 & 0 \\ 0 & \vdots & 0 \\ 0 & 0 & \Phi_K \end{bmatrix}$$

where BlockDiag(.) function generates a block diagonal matrix by placing input matrix arguments at diagonals.

Another aspect of this invention is directed to a generalized decision feedback equalizer (GDFE) based precoder in a base station (BS) of a multi-user multiple-input multiple-output (MU-MIMO) wireless system having K user terminals (UTs) which communicate with the base station via an uplink (UL) channel and a corresponding downlink (DL) channel, the base station having $N_t$ antennas and $P_t$ as available transmit power, the DL channel being represented by a DL channel matrix $H_{DL}$. The GDFE precoder comprises a decision feedback equalizing stage for processing user symbols to produce filtered vector symbols, the decision feedback equalizing stage including an interference pre-cancellation stage having an interference pre-cancellation matrix G used in a transmitter at the interference pre-cancellation stage; and a transmit filter represented by a transmit filter matrix B for processing the filtered vector symbols after the decision feedback equalizing stage to produce an output of transmitted signals to be directed to the DL channel represented by the DL channel matrix $H_{DL}$ through which communications occur in the wireless system with the user terminals. The interference pre-cancellation matrix G is computed based on a feedforward filter matrix F and a filter matrix C, the feedforward filter matrix F is computed based on the filter matrix C, and the filter matrix C is computed based on an uplink (UL) covariance matrix D. The UL covariance matrix D is computed by computing an effective UL channel matrix $H_{UL}$ using one of two methods (i) $H_{UL}=H_{DL}^H$, or (ii) $H_{UL}=[(P_t/N_t)H_{DL}^H H_{DL}+I]^{-1/2}H_{DL}^H$; extracting $H_k$, k=1, 2, ..., K, from the UL channel matrix $H_{UL}=[H_1^H, H_2^H, \ldots, H_K^H]$, where $H_k^H$ corresponds to an equivalent UL channel for the $k^{th}$ UT, and I is an identity matrix; computing a singular value decomposition (SVD) of the DL channel between the BS and $k^{th}$ UT, $H_k$, for all K UTs, $H_k = U_k S_k V_k^H$, where $U_k$ denotes left singular vectors, $S_k$ is a diagonal matrix with singular values making up the diagonal, and $V_k$ denotes right singular vectors; extracting all singular values as $s=[\text{diag}(S_1), \ldots, \text{diag}(S_K)]$; extracting a vector $\hat{s}$ from s by choosing first utmost $N_t$ largest non-zero singular values of s; sorting elements in $\hat{s}$ in decreasing order; performing water-filling to allocate power and obtain a diagonal matrix $\Gamma_k$ representing power allocations corresponding to the singular values of the $k^{th}$ UT; computing an UL covariance matrix for each UT as $\Phi_k = U_k \Gamma_k U_k^H$; and obtaining an overall input covariance matrix D for the equivalent UL channel as $$D = BlockDiag[\Phi_1, \Phi_2, \ldots, \Phi_K] = \begin{bmatrix} \Phi_1 & 0 & 0 \\ 0 & \vdots & 0 \\ 0 & 0 & \Phi_K \end{bmatrix}$$

where BlockDiag(.) function generates a block diagonal matrix by placing input matrix arguments at diagonals.

These and other features and advantages of the present invention will become apparent to those of ordinary skill in the art in view of the following detailed description of the specific embodiments.

DETAILED DESCRIPTION OF THE INVENTION

Figure 1:
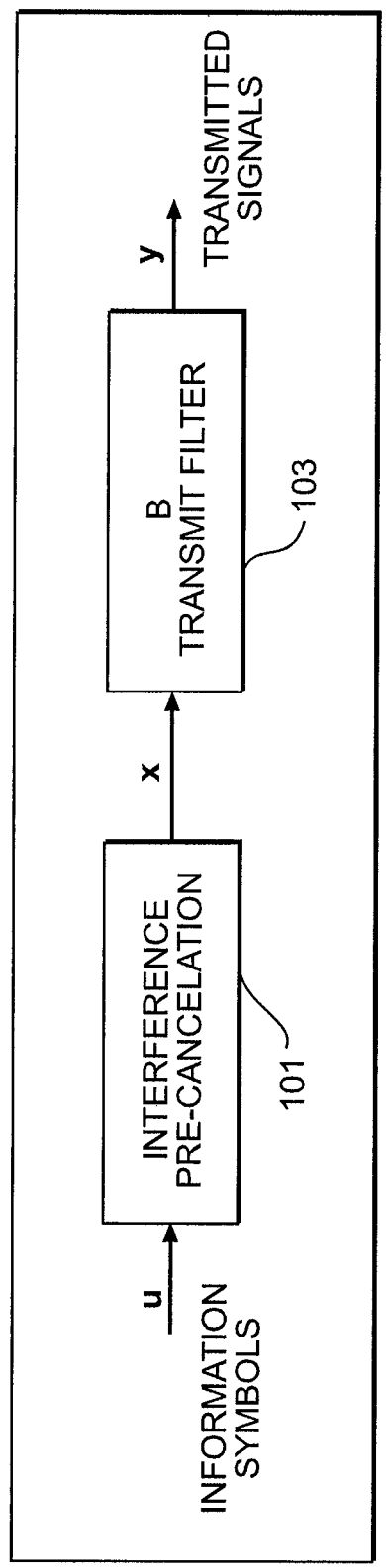
FIG. 1 is a block diagram of a known GDFE precoder.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for GDFE precoder configuration in MIMO systems and input covariance matrix calculation.

One feature of this invention focuses on the method to compute the Input Covariance Matrix in general and its application to the GDFE precoder of U.S. patent application Ser. No. 12/401,711. The GDFE precoder configuration of Ser. No. 12/401,711 is summarized herein below. There are known methods for computing the input covariance matrix D for the equivalent Uplink (UL) or MAC channel in a Multiuser MIMO system. The user terminals (UTs) are supposed not to share their data and thus no cooperation among them is assumed. The above-referenced Jindal et al. reference [6] presents a computationally efficient algorithm to compute individual input covariance matrices $\Phi_k$ for all UTs for the UL channel. These individual matrices can be arranged to obtain the overall input covariance matrix D. However, that algorithm is not very suitable with regards to its application to the GDFE precoder outlined in Ser. No. 12/410,711 as it does not guarantee rank$(D) \leq N_t$ where $N_t$ denotes total transmit antennas at the BS. This becomes critical to the design of GDFE precoder in Ser. No. 12/401,711 especially when the total number of antennas at the UTs exceeds those at the BS. The present invention overcomes the above stated problem and in the process provides computationally efficient algorithms for determining Input Covariance Matrices (for UL and DL channels). Additionally, the present invention leads to insignificant loss in capacity.

A. System Model

First, the system model and notations used herein are set forth. Let the base station (BS) have $N_t$ antennas and let there be K user terminals (UTs) with $L_k$ antennas each. The sum of antennas at all UTs is denoted as $L = \Sigma_{k=1}^{K} L_k$. Let $H_k$ denote the channel gain matrix of dimensions $\{L_k \times N_t\}$ between the BS and the $k^{th}$ UT. The combined channel gain matrix between the BS and the K UTs is of dimension $\{L \times N_t\}$ and is given by $H = [H_1^T \ H_2^T \ \ldots \ H_K^T]^T$, where the superscript $^T$ denotes the matrix transpose.

Let $u_k$ denote the input symbol vector destined for the $k^{th}$ UT, so that the stacked input vector can be represented as $u = [u_1^T u_2^T \ldots u_K^T]^T$. The length of u is assumed not to exceed the number of antennas at the BS. Also, assume the additional constraint that $S_{uu} = E[uu^H] = I$, where $E[.]$ indicates the time average of its argument, the superscript H denotes the conjugate transpose and I denotes the identity matrix.

A.1 Definitions

Figure 2:
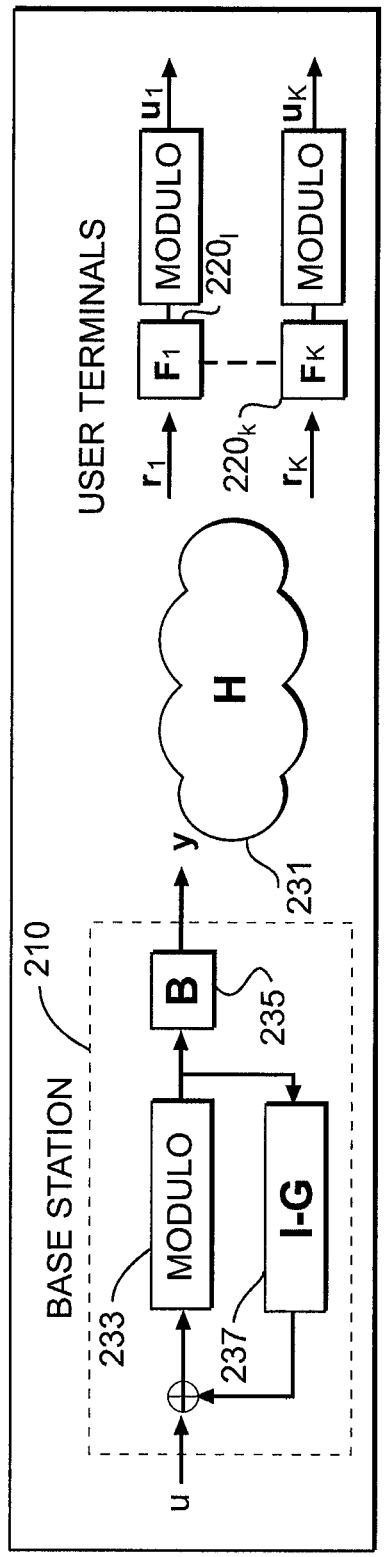
FIG. 2 is a block diagram of a communications system using GDFE precoding.

Referring to FIG. 2, a functional block diagram is shown of a MU-MIMO system having a base station 210 and user terminals $220_1$-$220_k$. Each user terminal has associated therewith a feedforward filter $F_1$-$F_K$. Communications occur through a channel 231 represented by a channel matrix H. The base station includes a GDFE precoder including a feedforward path and a feedback path. In the feedforward path, a modulo unit 233 produces a stream of filtered vector symbols X, which are filtered by a transmit filter 235 to produce a transmitted signal stream y. In the feedback path, the symbols X are fed back through an interference pre-cancellation block 237, represented by an interference pre-cancellation matrix G subtracted from the identity matrix I. A stream of user symbols u has subtracted therefrom an output signal of the interference pre-cancellation block 237, with the result being applied to the modulo unit 233.

Other aspects/parameters related to this system model are described below:

1). Interference Pre-Cancellation Matrix (G): This matrix is used at the transmitter at Interference Pre-cancellation Stage of the GDFE precoder as shown in FIG. 2. The main purpose of this matrix is to process input symbol vector u for interference pre-cancellation purposes. Its structure is that of an Upper Right Triangular matrix with block diagonal sub-matrices being identity matrices each of size $a_k$.

2). Input Covariance Matrix for Downlink Channel ($S_{xx}$): It is defined as $S_{xx} = E[xx^H]$ and satisfies the transmit power constraint, i.e., trace$(S_{xx}) \leq P_t$, where $P_t$ denotes the total available transmit power and trace(.) indicates the sum of diagonal elements of the matrix argument. The input covariance matrix for the downlink channel represents dependencies of symbols transmitted from different ones of said $N_t$ transmit antennas; a sum of diagonal matrix elements represents an intended total transmit power from the $N_t$ transmit antennas. In the following text, $S_{xx}$ will be represented using its Eigen Value Decomposition (EVD) as:

$$S_{xx} = V \Sigma V^H \quad (1)$$

where V is a unitary matrix and $\Sigma$ is a diagonal matrix with non-negative entries.

3). Transmit Filter (B): This matrix is used to process the symbol vector x obtained after the DFE stage of the GDFE precoder as shown in FIG. 2. It is denoted by the following equation:

$$B = V \Sigma^{1/2} M \quad (2)$$

where M is a unitary matrix and the matrices $\{V, \Sigma\}$ are same as defined in (1).

4). Least Favorable Noise Covariance Matrix ($S_2$): This may be regarded as the noise covariance matrix that results in the minimum system capacity when full coordination among all UTs is assumed. This is a positive definite Hermitian Matrix whose block diagonal sub-matrices are identity matrices of size $a_k$. This is defined in a similar fashion to that shown in Eq. (67) of the Yu and Cioffi reference [4].

5). Input Covariance Matrix for Equivalent Uplink Channel (D): It is defined similar to the Equation (3.6) of reference [7] as the correlation among the symbols of the input vector for the equivalent Uplink/Medium Access Channel (MAC) with channel matrix $H^H$. The structure of matrix D is that of a block diagonal matrix and satisfies the transmit power constraint, i.e., trace$(D) \leq P_t$, where $P_t$ denotes the total available transmit power. Each block diagonal sub-matrix of D represents the input covariance matrix for a particular UT in the uplink channel. A capacity optimal D can be computed using the methodology presented in reference [6].

A.2 Transmitter Processing

As shown in FIG. 2, the GDFE precoder includes an interference pre-cancellation block denoted by I-G, where G has the structure of a Block Upper Right Triangular matrix. Similar to the THP precoding scheme of reference [2], the triangular structure of the feedback matrix G helps to ensure that the symbol vector encoded at the $k^{th}$ step will suffer from the interference from (k−1) symbol vectors only. The $x_k^{th}$ sub-vector of $x=[x_1^T x_2^T \ldots x_K^T]^T$ is generated using the following relationship:

$$x_k = \left(u_k - \sum_{m=k+1}^{K} G_{km}x_m\right) + \alpha_k \quad (3)$$

where $G_{km}$ denotes the sub-matrix of G required to pre-cancel interference due to the vector symbol $x_m$ from $x_k$. These sub-vectors are generated in the reverse order, with $x_k$ being the first generated vector and $x_1$ being the last one. An example of the structure of the matrix G for a 3 UT scenario is shown below $$G = \begin{bmatrix} I & G_{12} & G_{13} \\ 0 & I & G_{23} \\ 0 & 0 & I \end{bmatrix} \quad (4)$$

In this particular example, $x_3$ is generated first, followed by $x_2$ from which interference due to $x_3$ is pre-subtracted using the sub-matrix $G_{23}$. Lastly, $x_1$ is generated after pre-subtraction of interference due to $x_2$ and $x_3$. Also, each complex element of vector $\alpha_k$ in (3) is chosen from the following set:

$$A = \{2\sqrt{S}(p_1 + jp_Q) | p_1, p_Q \in \{\pm 1, \pm 3, \ldots, \pm(\sqrt{S}-1)\}\}, \quad (5)$$

where S is the constellation size.

The elements of $a_k$ are chosen such that the elements of the resulting vector $x_k$ are bounded by the square region of width $2\sqrt{S}$. This mechanism, while allowing for interference pre-cancellation, also limits the total transmit power.

The vector x is then passed through a transmit filter B to yield a vector y given by the following relationship:

$$y = Bx \quad (6)$$

The vector y is transmitted by mapping its element to the respective antenna elements of the Base Station.

A.3 Receiver Processing

Let the feedforward filter employed by $k^{th}$ UT be denoted by $F_k$, which is a matrix of dimension $\{a_k \times L_k\}$ where $a_k$ denotes the length of vector $u_k$. Now, the received baseband vector corresponding to the $k^{th}$ UT is given by $$r_k = F_k H B x + F_k n_k \quad (7)$$

where x is the symbol vector derived from input symbol vector u after an interference pre-cancellation step as shown in FIG. 2.

The filter B indicates the transmit filter, and noise at $k^{th}$ UT is denoted by $n_k$. The stacked received baseband vector corresponding to all K UTs can be represented as $$r = FHBx + Fn \quad (8)$$

where $F=\text{diag}(F_1, F_2, \ldots F_K)$ is a block diagonal matrix representing the feedforward filter and n represents the stacked noise vector.

B. Computation of GDFE Precoder Matrices

Figure 3:
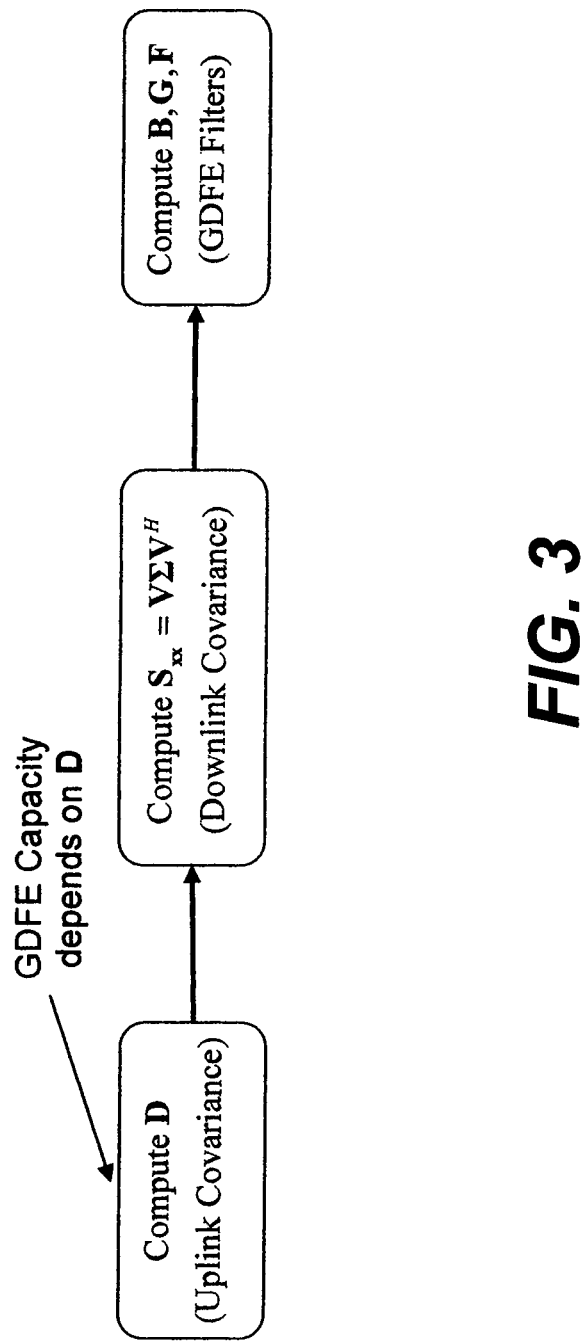
FIG. 3 is a block diagram showing the computation sequence for determining GDFE precoder components.

FIG. 3 is a block diagram showing the computation sequence for determining GDFE precoder components. Unlike prior methods, in the present method the feedforward filter, F, is expressed as:

$$F = GM^H(H_{DL}V\Sigma^{1/2})^H[H_{DL}S_{xx}H_{DL}^H + S_{zz}]^{-1} \quad (9)$$

where the "Least Favorable Noise," $S_{zz}$, may be regarded as the noise covariance matrix that results in the minimum system capacity when there is full coordination among all UTs. $S_{zz}$ may be computed using the technique described in reference [4]. The matrices $\{V, \Sigma\}$ are same as defined in (1).

Figure 5:
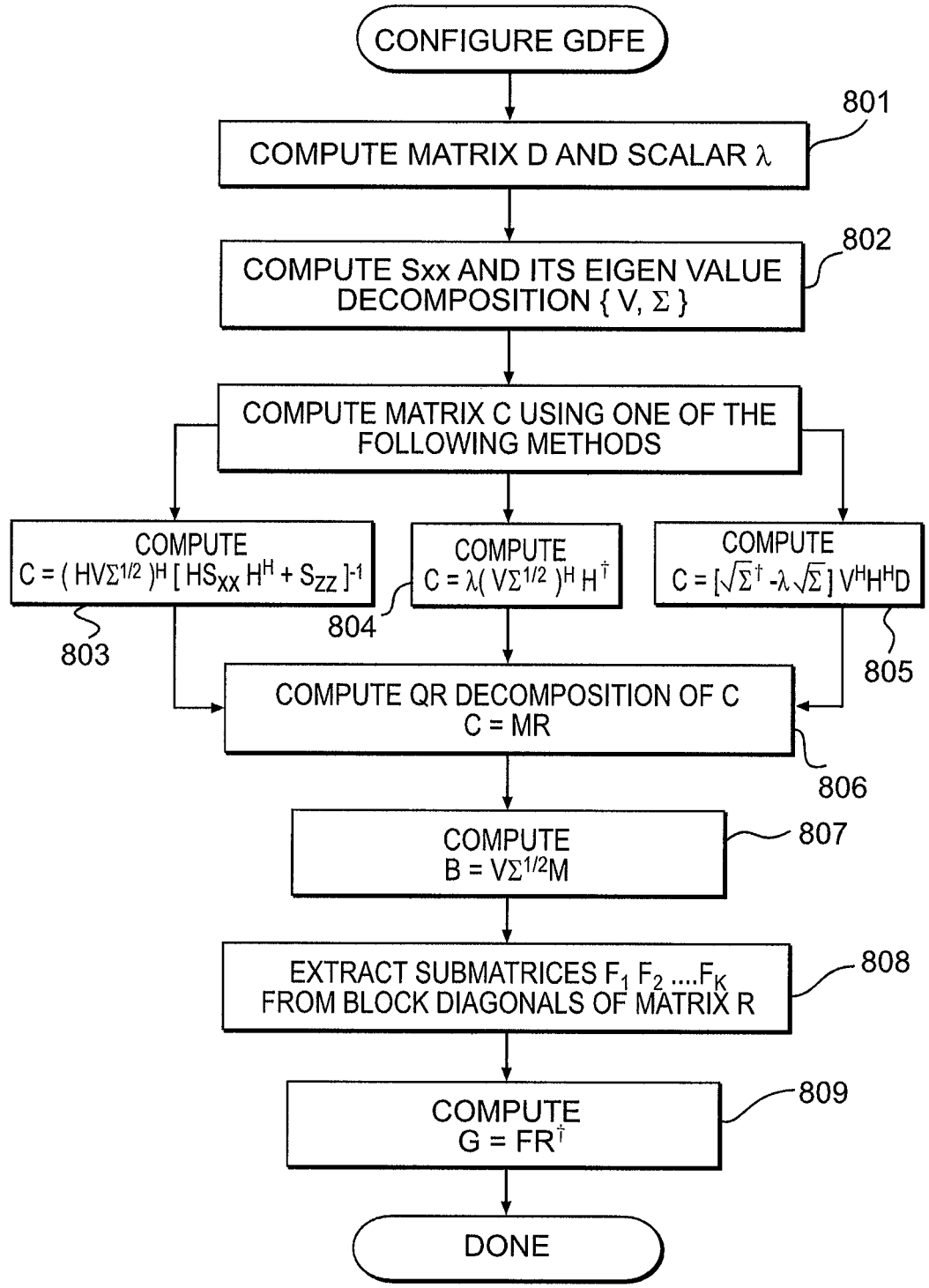
FIG. 5 is a flow diagram of configuring a GDFE precoder.

FIG. 5 shows a flow diagram of configuring a GDFE precoder. The input covariance matrix $S_{xx}$ for the downlink channel may be computed by first computing the input covariance matrix D for the equivalent Uplink/Medium Access Channel (MAC) with channel gain matrix $H^H$ (step 801 in FIG. 5). The capacity achieved by the proposed GDFE method is the same as the capacity achieved by the choice of D for the equivalent uplink channel; A capacity optimal D can be computed using the methodology presented in reference [6]. The input covariance matrix $S_{xx}$ for the downlink channel can then be computed (step 802) using the following equation given in reference [7]:

$$S_{xx} = \frac{I - [H_{DL}^H D H_{DL} + I]^{-1}}{\lambda} \quad (10)$$

where for a given total transmit power $P_t$, the scalar variable $\lambda$ denotes the UL/DL duality variable as defined in [7] and can be computed as $$\lambda = \text{trace}(I - [H_{DL}^H D H_{DL} + I]^{-1})/P_t \quad (11)$$

Next, a filter matrix C is defined as (step 803 in FIG. 5):

$$C = (H_{DL} V \Sigma^{1/2})^H [H_{DL} S_{xx} H_{DL}^H + S_{zz}]^{-1} \quad (12)$$

Alternative ways of computing the filter matrix C are shown in step 804 and step 805, and described in detail in Ser. No. 12/401,711.

Now, the feedforward filter F can be represented as $$F = GM^H C \quad (13)$$

It can be noted that F is Block Diagonal and G is Block Upper Right Triangular with Identity matrices forming its diagonal block. Given that M is unitary matrix; pre-multiplication of $M^H$ with C must result in a Block Upper Right Triangular matrix R. Hence, M can be obtained using the QR decomposition (QRD) of C as (step 806):

$$C = MR \quad (14)$$

It must be noted that the QRD is performed in such a way that all non-zero columns of C which span the same vector space contribute to only one column vector in matrix M. Computation of matrices B, G and F is then performed as follows:

Compute $B = V\Sigma^{1/2}M$ (step 807)  (15)

Set $F = \text{BlockDiagonal}(R)$ (step 808)  (16)

Figure 4:
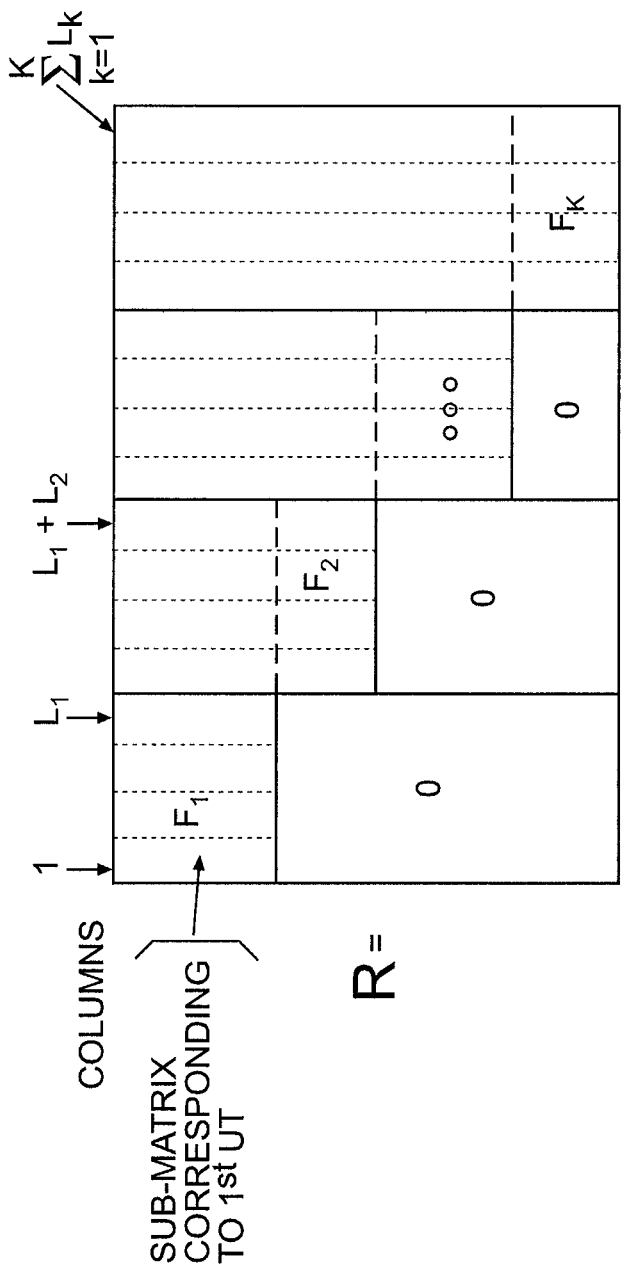
FIG. 4 is a block diagram of configuring a feedforward filter of the GDFE precoder.

The BlockDiagonal(.) function extracts submatrices $F_1$, $F_2 \ldots, F_K$ of size $\{a_k \times L_k\}$ from the block diagonals of the matrix R as illustrated in FIG. 4 which shows a block diagram of configuring the feedforward filter of the GDFE precoder. The number of symbols, $a_k$, allotted to the $k^{th}$ UT equals the rank of $F_k$.

Compute $G = FR^\dagger$ (step 809)  (17)

where the superscript † denotes the Moore-Penrose Generalized Inverse.

B.1 Calculation of Input Covariance Matrix for UL Channel

The input covariance matrix for UL channel (D) has a block diagonal structure where the $k^{th}$ sub-matrix of the block diagonal represents the input covariance matrix for the $k^{th}$ UT. The block diagonal structure of D implies that there is no coordination among the UTs. To be more specific, if $u=[u_1^H\ u_2^H\ \ldots\ u_K^H]^H$ denotes the joint transmit vector for all UTs, then D can be represented as $$D = E[uu^H] = \begin{bmatrix} \Phi_1 & 0 & 0 \\ 0 & \vdots & 0 \\ 0 & 0 & \Phi_K \end{bmatrix} \quad (18)$$

where, $$\Phi_k = E[u_k u_k^H] \quad (19)$$

and, $$\text{trace}(D) \le P_t \quad (20)$$

where $P_t$ denotes the total available transmit power and trace(.) indicates the sum of diagonal elements of the matrix argument. For a given total transmit, $P_t$, a capacity optimal D can be found using the algorithm of [6]. However, [6] does not guarantee the condition $\text{rank}(D) \le N_r$. In this invention, we present a modified version of the algorithm in reference [6] which is more efficient and suitable for the design of GDFE precoder as described in Ser. No. 12/401,711 and summarized above.

Figure 7:
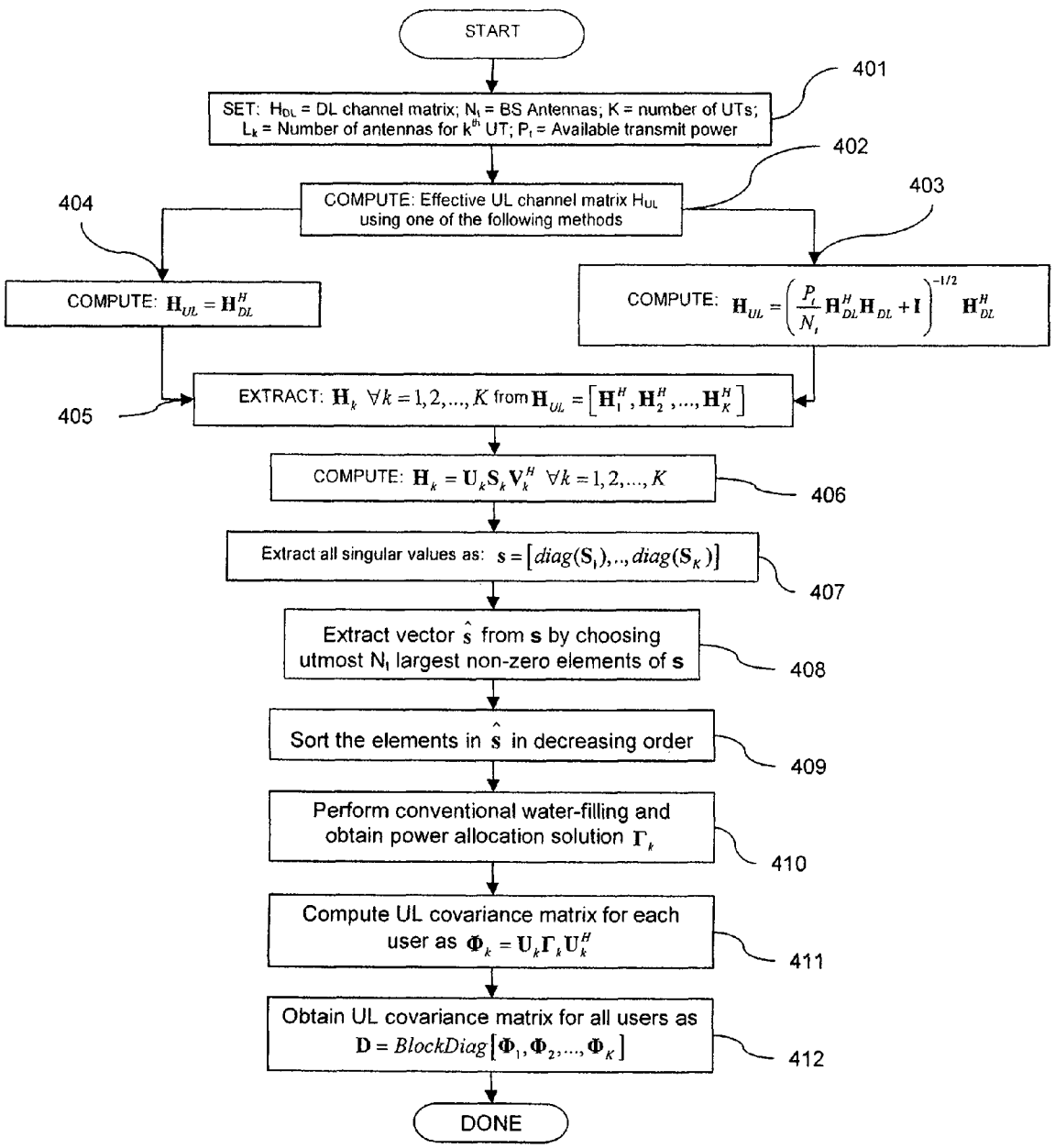
FIG. 7 is a flow diagram for computing the input covariance matrix for the UL channel according to embodiments of the present invention.

FIG. 7 is a flow diagram for computing the input covariance matrix D for the UL channel. In step 401, the program sets $H_{DL}$ as the DL channel matrix, $N_t$ as the BS antennas, K as the number of UTs, $L_k$ as the number of antennas for the $k^{th}$ UT, and $P_t$ as the available transmit power. In step 402, the program computes the UL channel matrix $H_{UL}$ using one of two methods described below.

B.1.1 First Method for Calculating D

According to the first method, $H_{UL}=H_{DL}^H$ (step 404). For a given DL channel, the corresponding UL channel can be represented as (step 405):

$$H_{UL}=[H_1^H, H_2^H, \ldots, H_K^H] \quad (21)$$

where $H_k^H$ corresponds to the equivalent UL channel for the $k^{th}$ UT.

Let the Singular Value Decomposition (SVD) of the DL channel between the BS and $k^{th}$ UT, $H_k$, be computed as (step 406):

$$H_k = U_k S_k V_k^H \quad (22)$$

where $U_k$ denotes left singular vectors, $S_k$ is a diagonal matrix with singular values making up the diagonal, and $V_k$ denotes the right singular vectors.

The SVD operation is performed for the channels corresponding to all K users. Next, we form a vector s comprising all singular values as (step 407)

$$s=[\text{diag}(S_1), \ldots, \text{diag}(S_K)] \quad (23)$$

Figure 6:
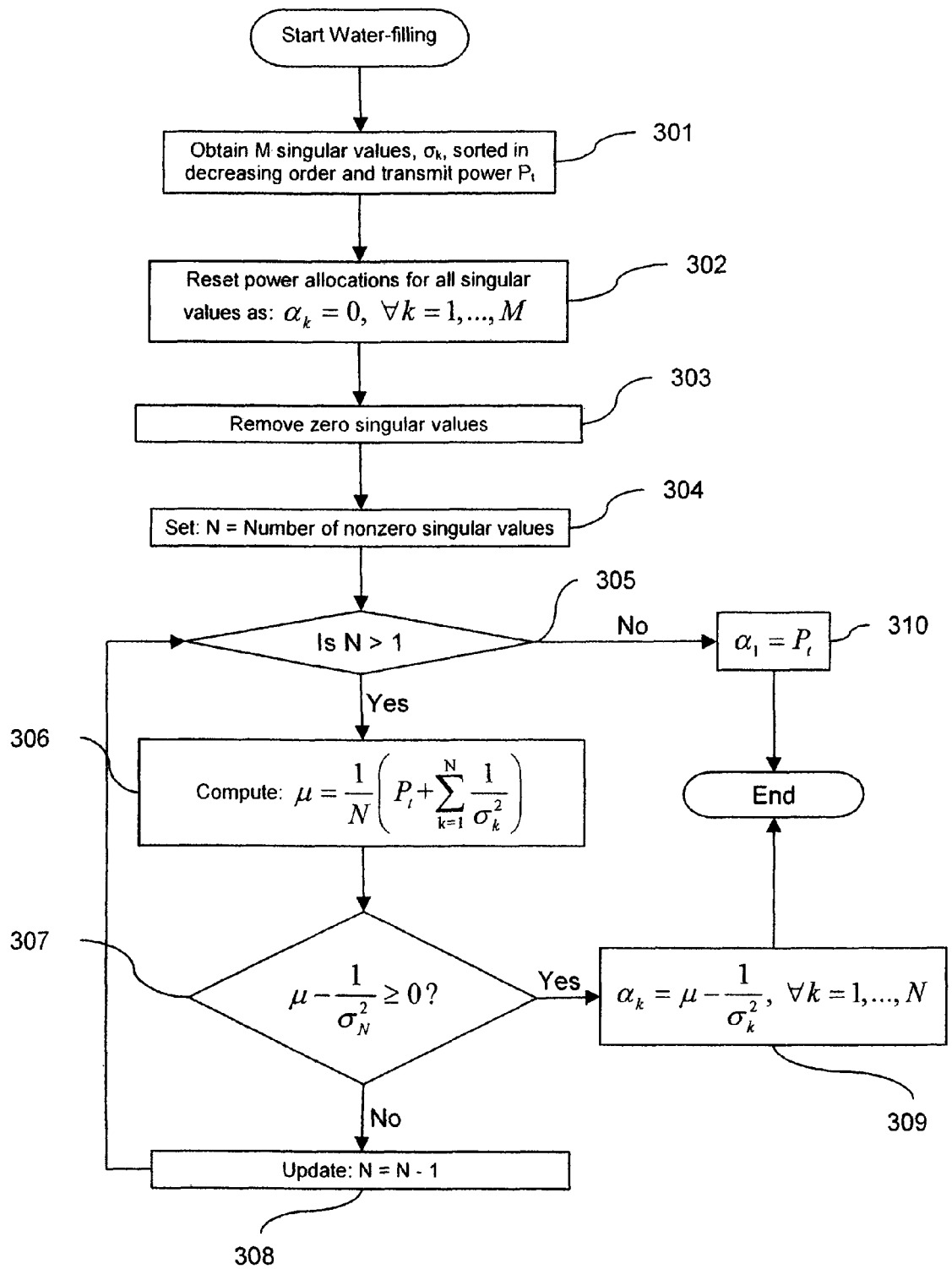
FIG. 6 is a flow diagram for a conventional water-filling algorithm.

The vector s may consist of non-zero singular values exceeding $N_t$. We, therefore, extract another vector ŝ from s by choosing first utmost $N_t$ largest non-zero singular values (step 408). Then, we sort the elements of ŝ in decreasing order (step 409) and perform conventional water-filling to allocate power (step 410). FIG. 6 is a flow diagram for a conventional water-filling algorithm. In step 301, the program obtains M singular values, $\sigma_k$, sorted in decreasing order and transmit power $P_t$. In step 302, the program resets the power allocations for all singular values as $\alpha_k=0, k=1,\ldots,M$. The program removes zero singular values (step 303) and sets N=Number of nonzero singular values. In step 305, the program determines whether N>1. If no, the program sets $\alpha_1=P_t$ in step 310, and ends. If yes, the program computes the level μ (step 306) and checks whether $(\mu-(1/\sigma_N^2))\ge 0$ (step 307). If yes, the program sets $\alpha_k=\mu-(1/\sigma_k^2)$ in step 309, and ends. If no, the program updates N=N−1 in step 308 and returns to steps 305.

Let the vector p denote the power allocations corresponding to the singular values in ŝ. Next, we form a diagonal matrix $\Gamma_k$ representing the power allocations corresponding to the singular values of the $k^{th}$ UT. If the $i^{th}$ singular value in $S_k$ was not included in ŝ, we set the $i^{th}$ diagonal entry of $\Gamma_k$ to be 0. On the other hand, if the $i^{th}$ singular value in $S_k$ was included in ŝ, then we set the $i^{th}$ diagonal entry of $\Gamma_k$ to be the corresponding power allocation contained in vector p. The resultant input covariance matrix for the $k^{th}$ UT is then obtained as (step 411)

$$\Phi_k = U_k \Gamma_k U_k^H \quad (24)$$

Thus, the overall input covariance matrix D for the equivalent UL channel can be represented as (step 412)

$$D = BlockDiag[\Phi_1, \Phi_2, \ldots, \Phi_K] = \begin{bmatrix} \Phi_1 & 0 & 0 \\ 0 & \vdots & 0 \\ 0 & 0 & \Phi_K \end{bmatrix} \quad (25)$$

where BlockDiag(.) function generates a block diagonal matrix by placing the input matrix arguments at the diagonals as shown in (25). Now, we can easily compute the corresponding input covariance matrix $S_{xx}$ for the DL channel using Equations (10)-(11) (see FIG. 8 and description below).

B.1.2 Second Method for Calculating D

The first approach described above for calculating D leads to some capacity loss if the sum of antennas at all UTs exceeds those at the BS. In that case, it is advantageous to "whiten" the equivalent UL channels after initial water-filling. According to the approach of reference [6], $k^{th}$ UT's equivalent UL channel after whitening is represented as:

$$\hat{H}_k^H = \left(\sum_{\substack{m=1 \\ m \ne k}}^{K} H_m^H \Phi_m H_m + I\right)^{-1/2} H_k^H \quad (26)$$

The above equation is computationally involved and needs to be computed for all UTs. In the following, we provide a heuristic approximation of this equation. We start with the following approximation:

$$\sum_{\substack{m=1 \\ m \ne k}}^{K} H_m^H \Phi_m H_m \approx \frac{P_t}{N_t} \sum_{m=1}^{K} H_m^H H_m \quad (27)$$

which can be simplified as, $$\sum_{\substack{m=1 \\ m \ne k}}^{K} H_m^H \Phi_m H_m \approx \frac{P_t}{N_t} H_{DL}^H H_{DL} \quad (28)$$

Thus, the whitened UL channel for each UT can be represented as $$\hat{H}_k^H \approx \left(\frac{P_t}{N_t}H_{DL}^H H_{DL} + I\right)^{-1/2} H_k^H \quad (29)$$

It is proposed that the approximation of whitening process in (29) leads to a similar effect as the original expression in (26). According to the second method, the overall whitened UL channel can be obtained as (step 403)

$$\hat{H}_{UL} = [\hat{H}_1^H, \hat{H}_2^H, \ldots, \hat{H}_K^H] \quad (30)$$
$$= \left(\frac{P_t}{N_t}H_{DL}^H H_{DL} + I\right)^{-1/2} H_{DL}^H$$

The above expression can either be evaluated directly or an SVD based method can be used as follows. Let the SVD decomposition of the DL channel be as follows:

$$H_{DL} = USV^H \quad (31)$$

Then, simplifying expression (30) using (31), the whitened UL channel can be represented as $$\hat{H}_{UL} = V\hat{S}^H U^H \quad (32)$$

where, $$\hat{S} = \left(\frac{P_t}{N_t}S + I\right)^{-1/2} S^H \quad (33)$$

Now, to obtain input covariance matrix for UL and DL channels, we follow the same steps 405-412 employing equations (21)-(25) above while using $H_{UL}$ as given in (30) or (32).

B.2 Calculation of Input Covariance Matrix for DL Channel

Figure 8:
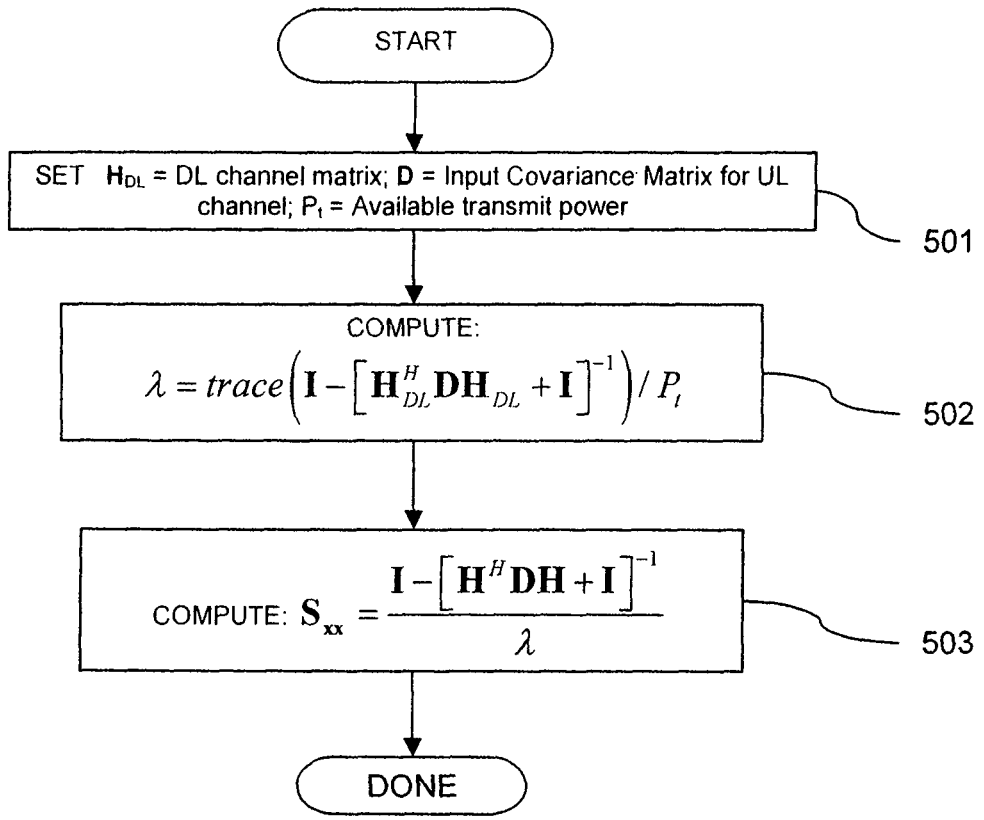
FIG. 8 is a flow diagram for computing the input covariance matrix for the DL channel.

FIG. 8 is a flow diagram for computing the input covariance matrix for the DL channel. In step 501, the program sets $H_{DL}$ as the DL channel matrix, D as the input covariance matrix for the UL channel, and $P_t$ as the available transmit power. The program computes the scalar variable λ according to equation (11) in step 502, and the input covariance matrix for the DL channel, $S_{xx}$, according to equation (10) in step 503.

C. Numerical Example

The following numerical example illustrates the computation of the Uplink Input Covariance (D) and Downlink Input Covariance ($S_{xx}$) matrices involved in the design of a GDFE precoder of the present invention. Consider a BS with 2 antennas and 2 users with 2 antennas each, so that the channel matrices associated with both of the users are of dimension 2×2. The transmit power is assumed to be 10. For the sake of simplicity, we consider a real channel as follows:

$$H = \begin{bmatrix} H_1 \\ H_2 \end{bmatrix} = \begin{bmatrix} 0.5869 & 2.3093 \\ -0.2512 & 0.5246 \\ 0.4801 & -0.0118 \\ 0.6682 & 0.9131 \end{bmatrix} \quad (34)$$

C.1 First Method

We first compute the SVD decomposition of $H_1$ and $H_2$ as follows $$H_1 = \underbrace{\begin{bmatrix} -0.9900 & -0.1413 \\ -0.1413 & 0.9900 \end{bmatrix}}_{U_1} \underbrace{\begin{bmatrix} 0.6650 & 0 \\ 0 & 0.5798 \end{bmatrix}}_{S_1} \underbrace{\begin{bmatrix} -0.8203 & -0.5719 \\ -0.5719 & 0.8203 \end{bmatrix}}_{V_1^H} \quad (35)$$

and, $$H_2 = \underbrace{\begin{bmatrix} -0.2636 & -0.9646 \\ -0.9646 & 0.2636 \end{bmatrix}}_{U_2} \underbrace{\begin{bmatrix} 1.1683 & 0 \\ 0 & 0.3820 \end{bmatrix}}_{S_2} \underbrace{\begin{bmatrix} -0.6600 & -0.7512 \\ -0.7512 & 0.6600 \end{bmatrix}}_{V_2^H} \quad (36)$$

Now, the vector s comprising all the singular values corresponding to channels H1 and H2 can be formed as $$s = [\text{diag}(S_1), \text{diag}(S_2)] = [0.6650, 0.5798, 1.1683, 0.3820] \quad (37)$$

Next, we extract vector from s by choosing at most $N_t$=2, with the largest singular values arranged in decreasing order as $$\hat{s} = [1.1683, 0.6650] \quad (38)$$

Now, the standard water-filling solution can be obtained using the flowchart shown in FIG. 6. The power allocations thus computed are $$p = [5.7643, 4.2357] \quad (39)$$

Next, we form a diagonal matrix $\Gamma_k$ representing the power allocations corresponding to the singular values of the $k^{th}$ UT as $$\Gamma_1 = \begin{bmatrix} 4.2357 & 0 \\ 0 & 0 \end{bmatrix} \quad (40)$$

and, $$\Gamma_2 = \begin{bmatrix} 5.7643 & 0 \\ 0 & 0 \end{bmatrix} \quad (41)$$

The resultant input covariance matrices are then obtained as $$\Phi_1 = U_1 \Gamma_1 U_1^H = \begin{bmatrix} 4.1512 & 0.5923 \\ 0.5923 & 0.0845 \end{bmatrix} \quad (42)$$

and, $$\Phi_2 = U_2 \Gamma_2 U_2^H = \begin{bmatrix} 0.4007 & 1.4659 \\ 1.4659 & 5.3636 \end{bmatrix} \quad (43)$$

Thus, the overall input covariance matrix D for the equivalent UL channel can be represented as $$D = BlockDiag[\Phi_1, \Phi_2] = \begin{bmatrix} 4.1512 & 0.5923 & 0 & 0 \\ 0.5923 & 0.0845 & 0 & 0 \\ 0 & 0 & 0.4007 & 1.4659 \\ 0 & 0 & 1.4659 & 5.3637 \end{bmatrix} \quad (44)$$

Next, we first determine the UL/DL duality variable and then use it to compute the downlink input covariance matrix $$\lambda = \text{trace}\left(I - [H_{DL}^H D H_{DL} + I]^{-1}\right)/P_t = 0.0986 \quad (45)$$

$$S_{xx} = \frac{I - [H_{DL}^H D H_{DL} + I]^{-1}}{\lambda} = \begin{bmatrix} 4.8403 & 4.1849 \\ 4.1849 & 5.1597 \end{bmatrix} \quad (46)$$

C.2 Second Method

The proposed whitened channel matrix for the UL channel can be obtained as $$\hat{H}_{UL} = [\hat{H}_1^H, \hat{H}_2^H] = \left(\frac{P_t}{N_t} H_{DL}^H H_{DL} + I\right)^{-1/2} H_{DL}^H = \quad (47)$$

$$\begin{bmatrix} 0.2226 & -0.1683 & 0.2115 & 0.1911 \\ 0.0639 & 0.2469 & -0.0583 & 0.3069 \end{bmatrix}$$

It is not difficult to realize that individual effective channel matrices can be computed as $$\hat{H}_1 \approx H_1\left(\frac{P_t}{N_t} H_{DL}^H H_{DL} + I\right)^{-1/2} = \begin{bmatrix} 0.2226 & 0.0639 \\ -0.1683 & 0.2469 \end{bmatrix} \quad (48)$$

and, $$\hat{H}_2 \approx H_2\left(\frac{P_t}{N_t} H_{DL}^H H_{DL} + I\right)^{-1/2} = \begin{bmatrix} 0.2115 & -0.0583 \\ 0.1911 & 0.3069 \end{bmatrix} \quad (49)$$

Now following the steps similar to Equations (35)-(43), we can arrive at the solution for UL and DL input covariance matrices as $$D = \begin{bmatrix} 0.6645 & -1.4062 & 0 & 0 \\ -1.4062 & 2.9756 & 0 & 0 \\ 0 & 0 & 0.3888 & 1.5237 \\ 0 & 0 & 1.5237 & 5.9711 \end{bmatrix} \quad (50)$$

and, $$S_{xx} = \begin{bmatrix} 4.8722 & 1.1725 \\ 1.1725 & 5.1278 \end{bmatrix} \quad (51)$$

D. Wireless Transmission System

Figure 9:
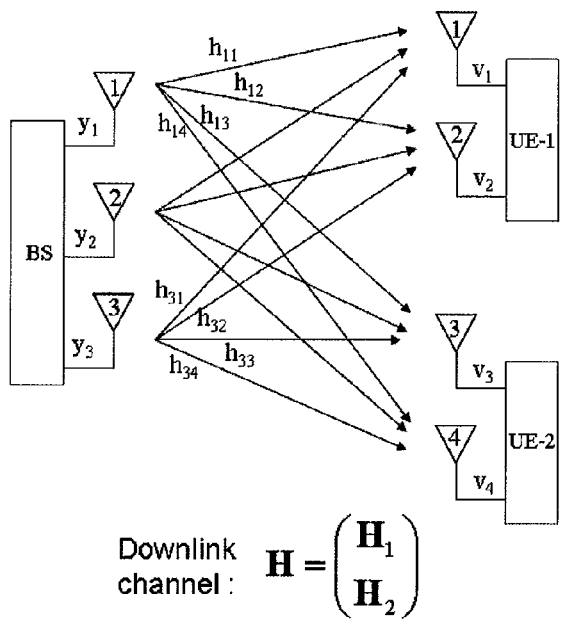
FIG. 9 is illustrates an example of a multi-user multiple-input multiple-output (MU-MIMO) wireless system showing a downlink channel representation of a multi-antenna base station (BS) and multiple user terminals (UEs) according to an embodiment of the invention.

FIG. 9 is illustrates an example of a multi-user multiple-input multiple-output (MU-MIMO) wireless system showing a downlink channel representation of a multi-antenna base station (BS) and multiple user terminals (UEs) according to an embodiment of the invention.

D.1 Channel Matrix Definition

The downlink channel between a base station (BS) and several user terminals (UEs) is normally represented as a matrix H whose number of rows equals to the sum of antennas at the UEs and number of columns is the same as the number of transmit antennas at the BS. The $(i,j)^{th}$ entry represents the complex channel gain $h_{ij}$ between the $i^{th}$ transmit antenna and $j^{th}$ receive antenna as shown in FIG. 9. In particular, complex channel gain $h_{ij}$ represents the amplification (or attenuation) that a transmitted signal undergoes in the wireless channel.

D.2 Channel Matrix Estimation

In a Frequency Division Duplex (FDD) system such as OFDMA, the complex channel gain $h_{ij}$ is usually estimated at the UE end. The channel estimation process is as follows. First, at the BS, antenna #1 transmits a reference signal. All the UEs estimate the received signal at each receiver antenna. As the reference signal is known to all UEs, the channel gain corresponding to the $1^{st}$ transmit antenna can be determined (assuming noise level is sufficiently below the reference signal power). This procedure is then repeated for transmit antennas number 2 to $N_t$.

In this way, the channel matrix $H_k$ corresponding to the $k^{th}$ UE can be estimated. Afterwards, all the UEs report back their respective channels to the BS using a dedicated feedback channel. The BS can then coalesce individual channel matrices to obtain the overall channel matrix H.

In Time Division Duplex (TDD) systems, the channel matrix can be estimated at the BS exploiting channel reciprocity property (i.e., UL and DL channels are related by some mathematical expression). For such systems, at a given time, one of the UEs will transmit a reference signal using a given antenna. This signal is captured by all the antennas at the BS and thus the corresponding channel gains are known. This process is repeated by all the UEs for all the available antennas, resulting in the estimate of complete Uplink channel matrix. The BS can then use some mathematical transformation (such as complex conjugation) to obtain equivalent downlink channel.

D.3 Information Flow from Base Station to User Terminals

Figure 10:
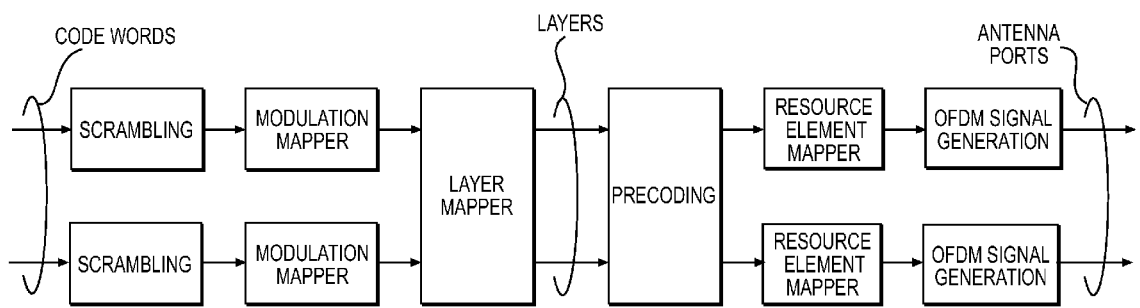
FIG. 10 illustrates an example of a communication block diagram for the downlink information flow at the base station of FIG. 9.

FIG. 10 illustrates an example of a communication block diagram for the downlink information flow at the base station of FIG. 9. The information to be sent to different UEs is represented by different codewords (one or more codewords can be assigned to a single UE). The bits in a given codeword are then scrambled using a predetermined scrambling code (Scrambling block) which is known both at the BS and UEs. The scrambled bits are then mapped (Modulation Mapper block) to a complex modulation symbol (e.g., BPSK, QPSK, QAM, etc.). These information symbols are then mapped (Layer Mapper block) to Layers (a stream of complex symbols) as shown in FIG. 10. The number of Layers is usually less than or equal to the rank of the channel matrix H. The information symbols mapped to different Layers are then processed in a Precoding block (which implements GDFE or THP etc). The precoded symbols are then mapped to resource elements within a Resource Element Mapper block (which is a rectangular grid of OFDM tones and time slots). These symbols are then fed to an OFDM Signal Generator and the output is mapped to the transmit antenna ports.

The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for GDFE precoder configuration in MIMO system and input covariance matrix calculation. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method for processing user symbols with a generalized decision feedback equalizer (GDFE) based precoder in a base station (BS) of a multi-user multiple-input multiple-output (MU-MIMO) wireless system having K user terminals (UTs) which communicate with the base station via an uplink (UL) channel and a corresponding downlink (DL) channel, the base station having $N_t$ antennas and $P_t$ as available transmit power, the DL channel being represented by a DL channel matrix $H_{DL}$, the method comprising:

a processor computing an effective UL channel matrix $H_{UL}$ using one of two methods (i) $H_{UL} = H_{DL}^H$, or $H_{UL} = [(P_t/N_t) H_{DL}^H H_{DL} + I]^{-1/2} H_{DL}^H$;

extracting $H_k$, k=1, 2, ..., K, from the UL channel matrix $H_{UL}[H_1^H, H_2^H, \ldots, H_K^H]$ where $H_k^H$ corresponds to an equivalent UL channel for the $k^{th}$ UT, and I is an identity matrix;

computing a singular value decomposition (SVD) of the DL channel between the BS and $k^{th}$ UT, $H_k$, for all K UTs, $$H_k = U_k S_k V_k^H$$

where $U_k$ denotes left singular vectors, $S_k$ is a diagonal matrix with singular values making up the diagonal, and $V_k$ denotes right singular vectors;

extracting all singular values as $$s = [\text{diag}(S_1), \ldots, \text{diag}(S_K)];$$

extracting a vector $\hat{s}$ from s by choosing first utmost $N_t$ largest non-zero singular values of s;

sorting elements in $\hat{s}$ in decreasing order;

performing water-filling to allocate power and obtain a diagonal matrix $\Gamma_k$ representing power allocations corresponding to the singular values of the $k^{th}$ UT;

computing an UL covariance matrix for each UT as $$\Phi_k = U_k \Gamma_k U_k^H;$$

obtaining an overall input covariance matrix D for the equivalent UL channel as $$D = BlockDiag[\Phi_1, \Phi_2, \ldots, \Phi_K] = \begin{bmatrix} \Phi_1 & 0 & 0 \\ 0 & \vdots & 0 \\ 0 & 0 & \Phi_K \end{bmatrix}$$

where BlockDiag(.) function generates a block diagonal matrix by placing input matrix arguments at diagonals;

computing a filter matrix C based on the UL covariance matrix D;

computing a feedforward filter matrix F based on the filter matrix C;

computing an interference pre-cancellation matrix G, based on the feedforward filter matrix F and the filter matrix C, used in a transmitter at an interference pre-cancellation stage of the GDFE precoder; and processing user symbols by a decision feedback equalizing stage of the GDFE precoder to produce filtered vector symbols.

2. The method of claim 1, further comprising:

if an $i^{th}$ singular value in $S_k$ was not included in $\hat{s}$, setting an $i^{th}$ diagonal entry of $\Gamma_k$ to be 0; and if an $i^{th}$ singular value in $S_k$ was included in $\hat{s}$, setting an $i^{th}$ diagonal entry of $\Gamma_k$ to be a corresponding power allocation contained in vector p which denotes the power allocations corresponding to the singular values in $\hat{s}$.

3. The method of claim 1, further comprising:
computing an input covariance matrix $S_{xx}$ for the DL channel $$S_{xx} = \frac{I - [H_{DL}^H DH_{DL} + I]^{-1}}{\lambda}$$

where for a given total transmit power $P_t$, a scalar variable $\lambda$ is $$\lambda = \text{trace}(I - [H_{DL}^H DH_{DL} + I]^{-1})/P_t$$

wherein $$C = (H_{DL} V \Sigma^{1/2})^H [H_{DL} S_{xx} H_{DL}^H + S_{zz}]^{-1},$$

$S_{xx}$ is represented using its Eigen Value Decomposition (EVD)

$$S_{xx} = V \Sigma V^H$$

where V is a unitary matrix and $\Sigma$ is a diagonal matrix with non-negative entries; and
$S_{zz}$ is a least favorable noise covariance matrix.

4. The method of claim 3,
wherein the feedforward filter matrix F is represented by $F = GM^H C$, M is a unitary matrix, and G is an interference pre-cancellation matrix used in a transmitter at an interference pre-cancellation stage of the GDFE precoder; and further comprising:
computing the matrix M using QR decomposition (QRD) of C as $$C = MR;$$

computing the feedforward filter matrix F as $$F = \text{BlockDiagonal}(R)$$

where the BlockDiagonal(.) function extracts submatrices $F_1, F_2 \ldots, F_K$ of size $\{a_k \times L_k\}$ from block diagonals of the matrix R, and $a_k$ is a number of symbols allotted to the $k^{th}$ user terminal (UT) and equals the rank of $F_k$; and
computing the interference pre-cancellation matrix G as $$G = FR^{\dagger}$$

where superscript $\dagger$ denotes a Moore-Penrose Generalized Inverse.

5. The method of claim 4, further comprising:
computing a transmit filter matrix B for a transmit filter $$B = V \Sigma^{1/2} M;$$

passing the filtered vector symbols through the transmit filter to produce an output of transmitted signals;
directing the output of the transmit filter to the channel represented by the DL channel matrix $H_{DL}$ through which communications occur in the wireless system with the user terminals.

6. The method of claim 1, wherein processing user symbols by a decision feedback equalizing stage of the GDFE precoder to produce filtered vector symbols comprises:
directing the user symbols through a modulo unit disposed in a feedforward path to produce the filtered vector symbols which are fed back through an interference pre-cancellation block disposed in a feedback path, the interference pre-cancellation block being denoted by I-G; and
subtracting an output signal of the interference pre-cancellation block from the user symbols which are applied to the modulo unit in the feedforward path.

7. A generalized decision feedback equalizer (GDFE) based precoder in a base station (BS) of a multi-user multiple-input multiple-output (MU-MIMO) wireless system having K user terminals (UTs) which communicate with the base station via an uplink (UL) channel and a corresponding downlink (DL) channel, the base station having $N_t$ antennas and $P_t$ as available transmit power, the DL channel being represented by a DL channel matrix $H_{DL}$, the GDFE precoder comprising:
a processor;
a feedforward path;
a feedback path; and
an interference pre-cancellation block denoted by I-G disposed in the feedback path, I being an identity matrix, G being an interference pre-cancellation matrix;
wherein the interference pre-cancellation matrix G is computed based on a feedforward filter matrix F and a filter matrix C, the feedforward filter matrix F is computed based on the filter matrix C, the filter matrix C is computed based on an uplink (UL) covariance matrix D, the UL covariance matrix D is computed by the processor,
the processor computes an effective UL channel matrix $H_{UL}$ using one of two methods
(i) $H_{UL} = H_{DL}^H$, or
(ii) $H_{UL} = [(P_t/N_T)H_{DL}^H H_{DL} + I]^{-1/2} H_{DL}^H$;
extracts $H_k$, $k = 1, 2, \ldots, K$, from the UL channel matrix $H_{UL} = [H_1^H, H_2^H, \ldots, H_K^H]$ where $H_k^H$ corresponds to an equivalent UL channel for the $k^{th}$ UT, and I is an identity matrix;
computes a singular value decomposition (SVD) of the DL channel between the BS and $k^{th}$ UT, $H_k$, for all K UTs, $$H_k = U_k S_k V_k^H$$

where $U_k$ denotes left singular vectors, $S_k$ is a diagonal matrix with singular values making up the diagonal, and $V_k$ denotes right singular vectors;
extracts all singular values as $$s = [\text{diag}(S_1), \ldots, \text{diag}(S_K)];$$

extracts a vector $\hat{s}$ from s by choosing first utmost $N_t$ largest non-zero singular values of s;
sorts elements in $\hat{s}$ in decreasing order;
performs water-filling to allocate power and obtain a diagonal matrix $\Gamma_k$ representing power allocations corresponding to the singular values of the $k^{th}$ UT;
computes an UL covariance matrix for each UT as $$\Phi_k = U_k \Gamma_k U_k^H; \text{ and}$$

obtains an overall input covariance matrix D for the equivalent UL channel as $$D = \text{BlockDiag}[\Phi_1, \Phi_2, \ldots, \Phi_K] = \begin{bmatrix} \Phi_1 & 0 & 0 \\ 0 & \vdots & 0 \\ 0 & 0 & \Phi_K \end{bmatrix}$$

where BlockDiag(.) function generates a block diagonal matrix by placing input matrix arguments at diagonals.

8. The GDFE precoder of claim 7, wherein computation of the UL covariance matrix D further comprises:
if an $i^{th}$ singular value in $S_k$ was not included in $\hat{s}$, setting an $i^{th}$ diagonal entry of $\Gamma_k$ to be 0; and
if an $i^{th}$ singular value in $S_k$ was included in $\hat{s}$, setting an $i^{th}$ diagonal entry of $\Gamma_k$ to be a corresponding power allocation contained in vector p which denotes the power allocations corresponding to the singular values in $\hat{s}$.

9. The GDFE precoder of claim 7, wherein $$C=(H_{DL}V\Sigma^{1/2})^H[H_{DL}S_{xx}H_{DL}{}^H+S_{zz}]^{-1},$$

where $S_{xx}$ is an input covariance matrix for the DL channel $$S_{xx}=\frac{I-[H_{DL}^H DH_{DL}+I]^{-1}}{\lambda},$$

where for a given total transmit power $P_t$, a scalar variable $\lambda$ is $$\lambda=\text{trace}(I-[H_{DL}{}^H DH_{DL}+I]^{-1})/P_t,$$

where $S_{xx}$ is represented using its Eigen Value Decomposition (EVD)

$$S_{xx}=V\Sigma V^H,$$

where V is a unitary matrix and $\Sigma$ is a diagonal matrix with non-negative entries, and where $S_{zz}$ is a least favorable noise covariance matrix.

10. The GDFE precoder of claim 9, wherein
the feedforward filter matrix F is represented by $F=GM^HC$, M is a unitary matrix, and G is the interference pre-cancellation matrix used in a transmitter at an interference pre-cancellation stage of the GDFE precoder;
the matrix M is a unitary matrix represented using QR decomposition (QRD) of C as $$C=MR;$$

the feedforward filter matrix F is $$F=\text{BlockDiagonal}(R)$$

where the BlockDiagonal(.) function extracts submatrices $F_1$, $F_2\ldots$, $F_K$ of size $\{a_k \times L_k\}$ from block diagonals of the matrix R, and $a_k$ is a number of symbols allotted to the $k^{th}$ user terminal (UT) and equals the rank of $F_k$; and
the interference pre-cancellation matrix G is $$G=FR^\dagger$$

where superscript † denotes a Moore-Penrose Generalized Inverse.

11. The GDFE precoder of claim 7, further comprising:
a modulo unit disposed in the feedforward path to produce a stream of filtered vector symbols X which are fed back through the interference pre-cancellation block disposed in the feedback path.

12. The GDFE precoder of claim 11,
wherein an output signal of the interference pre-cancellation block is subtracted from a stream of user symbols and applied to the modulo unit in the feedforward path.

13. The GDFE precoder of claim 12, further comprising:
a transmit filter represented by the transmit filter matrix B for filtering the stream of filtered vector symbols X produced by the modulo unit disposed in the feedforward path;
wherein the transmit filter matrix B is $$B=V\Sigma^{1/2}M.$$

14. A MU-MIMO wireless system comprising:
a base station including a GDFE precoder;
a plurality of K user terminals; and
a channel to receive an output of the transmit filter;
wherein the GDFE precoder is a generalized decision feedback equalizer (GDFE) based precoder in a base station (BS) of a multi-user multiple-input multiple-output (MU-MIMO) wireless system having K user terminals (UTs) which communicate with the base station via an uplink (UL) channel and a corresponding downlink (DL) channel, the base station having $N_t$ antennas and $P_t$ as available transmit power, the DL channel being represented by a DL channel matrix $H_{DL}$, the GDFE precoder comprising:
a processor;
a feedforward path;
a feedback path; and
an interference pre-cancellation block denoted by I-G disposed in the feedback path, I being an identity matrix, G being an interference pre-cancellation matrix;
wherein the interference pre-cancellation matrix G is computed based on a feedforward filter matrix F and a filter matrix C, the feedforward filter matrix F is computed based on the filter matrix C, the filter matrix C is computed based on an uplink (UL) covariance matrix D, the UL covariance matrix D is computed by the processor,
the processor computes an effective UL channel matrix $H_{UL}$ using one of two methods
(i) $H_{UL}=H_{DL}{}^H$, or
$H_{UL}=[(P_t/N_t)H_{DL}{}^H H_{DL}+I]^{-1/2}H_{DL}{}^H$;
extracts $H_k$, k=1, 2, . . . , K, from the UL channel matrix $H_{UL}[H_1{}^H, H_2{}^H, \ldots, H_k{}^H]$ where $H_k{}^H$ corresponds to an equivalent UL channel for the $k^{th}$ UT, and I is an identity matrix;
computes a singular value decomposition (SVD) of the DL channel between the BS and $k^{th}$ UT, $H_k$, for all K UTs, $$H_k=U_k S_k V_k^H$$

where $U_k$ denotes left singular vectors, $S_k$ is a diagonal matrix with singular values making up the diagonal, and $V_k$ denotes right singular vectors;
extracts all singular values as $$s=[\text{diag}(S_1),\ldots,\text{diag}(S_K)];$$

extracts a vector $\hat{s}$ from s by choosing first utmost $N_t$ largest non-zero singular values of s;
sorts elements in $\hat{s}$ in decreasing order;
performs water-filling to allocate power and obtain a diagonal matrix $\Gamma_k$ representing power allocations corresponding to the singular values of the $k^{th}$ UT;
computes an UL covariance matrix for each UT as $$\Phi_k=U_k\Gamma_k U_k^H;$$

obtains an overall input covariance matrix D for the equivalent UL channel as $$D=\text{BlockDiag}[\Phi_1, \Phi_2, \ldots, \Phi_K]=\begin{bmatrix}\Phi_1 & 0 & 0\\ 0 & \vdots & 0\\ 0 & 0 & \Phi_K\end{bmatrix}$$

where BlockDiag(.) function generates a block diagonal matrix by placing input matrix arguments at diagonals;
wherein the GDFE precoder further comprises a modulo unit disposed in the feedforward path to produce a stream of filtered vector symbols X which are fed back through the interference pre-cancellation block disposed in the feedback path;
wherein an output signal of the interference pre-cancellation block is subtracted from a stream of user symbols and applied to the modulo unit in the feedforward path,
wherein the GDFE precoder further comprises a transmit filter represented by the transmit filter matrix B for filtering the stream of filtered vector symbols X produced by the modulo unit disposed in the feedforward path;

wherein the transmit filter matrix B is $B=V\Sigma^{1/2}M$; and wherein the channel is represented by the DL channel matrix $H_{DL}$ through which communications occur in the wireless system with the user terminals.

15. A generalized decision feedback equalizer (GDFE) based precoder in a base station (BS) of a multi-user multiple-input multiple-output (MU-MIMO) wireless system having K user terminals (UTs) which communicate with the base station via an uplink (UL) channel and a corresponding downlink (DL) channel, the base station having $N_t$ antennas and $P_t$ as available transmit power, the DL channel being represented by a DL channel matrix $H_{DL}$, the GDFE precoder comprising:

a decision feedback equalizing stage for processing, by a processor, user symbols to produce filtered vector symbols, the decision feedback equalizing stage including an interference pre-cancellation stage having an interference pre-cancellation matrix G used in a transmitter at the interference pre-cancellation stage; and a transmit filter represented by a transmit filter matrix B for processing, by the processor, the filtered vector symbols after the decision feedback equalizing stage to produce an output of transmitted signals to be directed to the DL channel represented by the DL channel matrix $H_{DL}$ through which communications occur in the wireless system with the user terminals;

wherein the interference pre-cancellation matrix G is computed based on a feedforward filter matrix F and a filter matrix C, the feedforward filter matrix F is computed based on the filter matrix C, the filter matrix C is computed based on an uplink (UL) covariance matrix D, the UL covariance matrix D is computed by the processor, the processor computes an effective UL channel matrix $H_{UL}$ using one of two methods (i) $H_{UL}=H_{DL}^H$, or (ii) $H_{UL}=[(P_t/N_t)H_{DL}^H H_{DL}+I]^{-1/2}H_{DL}^H$;

extracts $H_k$, k=1, 2, ..., K, from the UL channel matrix $H_{UL}=[H_1^H, H_2^H, ..., H_K^H]$ where $H_k^H$ corresponds to an equivalent UL channel for the $k^{th}$ UT, and I is an identity matrix;

computes a singular value decomposition (SVD) of the DL channel between the BS and $k^{th}$ UT, $H_k$, for all K UTs, $H_k=U_k S_k V_k^H$ where $U_k$ denotes left singular vectors, $S_k$ is a diagonal matrix with singular values making up the diagonal, and $V_k$ denotes right singular vectors;

extracts all singular values as $s=[\text{diag}(S_1), ..., \text{diag}(S_K)]$;

extracts a vector ŝ from s by choosing first utmost $N_t$ largest non-zero singular values of s;

sorts elements in ŝ in decreasing order;

performs water-filling to allocate power and obtain a diagonal matrix $\Gamma_k$ representing power allocations corresponding to the singular values of the $k^{th}$ UT;

computes an UL covariance matrix for each UT as $\Phi_k=U_k \Gamma_k U_k^H$; and obtains an overall input covariance matrix D for the equivalent UL channel as $$D = BlockDiag[\Phi_1, \Phi_2, ..., \Phi_K] = \begin{bmatrix} \Phi_1 & 0 & 0 \\ 0 & \vdots & 0 \\ 0 & 0 & \Phi_K \end{bmatrix}$$

where BlockDiag(.) function generates a block diagonal matrix by placing input matrix arguments at diagonals.

16. The GDFE precoder of claim 15, wherein computation of the UL covariance matrix D further comprises:

if an $i^{th}$ singular value in $S_k$ was not included in ŝ, setting an $i^{th}$ diagonal entry of $\Gamma_k$ to be 0; and if an $i^{th}$ singular value in $S_k$ was included in ŝ, setting an $i^{th}$ diagonal entry of $\Gamma_k$ to be a corresponding power allocation contained in vector p which denotes the power allocations corresponding to the singular values in ŝ.

17. The GDFE precoder of claim 15, wherein $C=(H_{DL}V\Sigma^{1/2})^H[H_{DL}S_{xx}H_{DL}^H+S_{zz}]^{-1}$, where $S_{xx}$ is an input covariance matrix for the DL channel $$S_{xx} = \frac{I - [H_{DL}^H D H_{DL} + I]^{-1}}{\lambda},$$

where for a given total transmit power $P_t$, a scalar variable $\lambda$ is $\lambda=\text{trace}(I-[H_{DL}^H D H_{DL}+I]^{-1})/P_t$, where $S_{xx}$ is represented using its Eigen Value Decomposition (EVD)

$S_{xx}=V\Sigma V^H$, where V is a unitary matrix and $\Sigma$ is a diagonal matrix with non-negative entries, and where $S_{zz}$ is a least favorable noise covariance matrix.

18. The GDFE precoder of claim 17, wherein the feedforward filter matrix F is represented by $F=GM^H C$, M being a unitary matrix;

the matrix M is represented using QR decomposition (QRD) of C as $C=MR$;

the feedforward filter matrix F is $F=\text{BlockDiagonal}(R)$ where the BlockDiagonal(.) function extracts submatrices $F_1$, $F_2$, ..., $F_K$ of size $\{a_k \times L_k\}$ from block diagonals of the matrix R, and $a_k$ is a number of symbols allotted to the $k^{th}$ user terminal (UT) and equals the rank of $F_k$;

the interference pre-cancellation matrix G is $G=FR^\dagger$ where superscript † denotes a Moore-Penrose Generalized Inverse; and the transmit filter matrix B is $B=V\Sigma^{1/2}M$.

19. The GDFE precoder of claim 15, wherein the decision feedback equalizing stage includes a modulo unit disposed in a feedforward path to produce a stream of filtered vector symbols X which are fed back through an interference pre-cancellation block disposed in a feedback path, the interference pre-cancellation block denoted by I-G disposed in the feedback path, wherein an output signal of the interference pre-cancellation block is subtracted from a stream of user symbols and applied to the modulo unit in the feedforward path.

20. A MU-MIMO wireless system comprising:

a base station including a GDFE precoder;

a plurality of K user terminals; and a channel to receive the output of the transmit filter;

wherein the GDFE precoder is a generalized decision feedback equalizer (GDFE) based precoder in a base station (BS) of a multi-user multiple-input multiple-output (MU-MIMO) wireless system having K user terminals (UTs) which communicate with the base station via an uplink (UL) channel and a corresponding downlink (DL) channel, the base station having $N_t$ antennas and $P_t$ as available transmit power, the DL channel being represented by a DL channel matrix $H_{DL}$, the GDFE precoder comprising:

a decision feedback equalizing stage for processing, by a processor, user symbols to produce filtered vector symbols, the decision feedback equalizing stage including an interference pre-cancellation stage having an interference pre-cancellation matrix G used in a transmitter at the interference pre-cancellation stage; and a transmit filter represented by a transmit filter matrix B for processing, by the processor, the filtered vector symbols after the decision feedback equalizing stage to produce an output of transmitted signals to be directed to the DL channel represented by the DL channel matrix $H_{DL}$ through which communications occur in the wireless system with the user terminals;

wherein the interference pre-cancellation matrix G is computed based on a feedforward filter matrix F and a filter matrix C, the feedforward filter F is computed based on the filter matrix C, the filter matrix C is computed based on an uplink (UL) covariance matrix D, the UL covariance matrix D is computed by the processor, the processor computes an effective UL channel matrix $H_{UL}$ using one of two methods (i) $H_{UL} = H_{DL}^H$, or $H_{UL} = [(P_t/N_t)H_{DL}^H H_{DL} + I]^{-1/2} H_{DL}^H$;

extracts $H_k$, k=1, 2, ..., K, from the UL channel matrix $H_{UL}[H_1^H, H_2^H, ..., H_K^H]$ where $H_k^H$ corresponds to an equivalent UL channel for the $k^{th}$ UT, and I is an identity matrix;

computes a singular value decomposition (SVD) of the DL channel between the BS and $k^{th}$ UT, $H_k$, for all K UTs, $H_k = U_k S_k V_k^H$ where $U_k$ denotes left singular vectors, $S_k$ is a diagonal matrix with singular values making up the diagonal, and $V_k$ denotes right singular vectors;

extracts all singular values as $s = [\text{diag}(S_1), ..., \text{diag}(S_K)]$;

extracts a vector $\hat{s}$ from s by choosing first utmost $N_t$ largest non-zero singular values of s;

sorts elements in $\hat{s}$ in decreasing order;

performs water-filling to allocate power and obtain a diagonal matrix $\Gamma_k$ representing power allocations corresponding to the singular values of the $k^{th}$ UT;

computes an UL covariance matrix for each UT as $\Phi_k = U_k \Gamma_k U_k^H$;

obtains an overall input covariance matrix D for the equivalent UL channel as $$D = BlockDiag[\Phi_1, \Phi_2, ..., \Phi_K] = \begin{bmatrix} \Phi_1 & 0 & 0 \\ 0 & \vdots & 0 \\ 0 & 0 & \Phi_K \end{bmatrix}$$

where BlockDiag(.) function generates a block diagonal matrix by placing input matrix arguments at diagonals;

wherein the channel is represented by the DL channel matrix $H_{DL}$ through which communications occur in the wireless system with the user terminals.

* * * * *